US009311568B1

(12) United States Patent
Feller et al.

(10) Patent No.: US 9,311,568 B1
(45) Date of Patent: Apr. 12, 2016

(54) RECIPE TEXT AND IMAGE EXTRACTION

(71) Applicant: Yummly, Inc., Redwood City, CA (US)

(72) Inventors: David B. Feller, Mountain View, CA (US); Gregory Allen Druck, Jr., San Francisco, CA (US); Vadim Geshel, Redwood City, CA (US)

(73) Assignee: Yummly, Inc., Redwood City, CA (US)

( * ) Notice: Subject to any disclaimer, the term of this patent is extended or adjusted under 35 U.S.C. 154(b) by 44 days.

(21) Appl. No.: 14/284,076

(22) Filed: May 21, 2014

(51) Int. Cl.
*G06K 9/62* (2006.01)

(52) U.S. Cl.
CPC .................................. *G06K 9/6267* (2013.01)

(58) Field of Classification Search
CPC .............................. G06K 9/6267; G06F 1/00
USPC ......................................................... 382/159
See application file for complete search history.

(56) References Cited

U.S. PATENT DOCUMENTS

| | | | | | |
|---|---|---|---|---|---|
| 5,832,446 | A * | 11/1998 | Neuhaus | ................ | G06Q 50/12 434/127 |
| 6,975,910 | B1 * | 12/2005 | Brown | ................ | G06F 19/3475 700/90 |
| 7,751,592 | B1 * | 7/2010 | Rosenberg | ........... | G06K 9/6293 382/112 |
| 8,930,367 | B2 * | 1/2015 | Okuma | ............. | G06F 17/30253 705/319 |
| 2008/0215561 | A1 * | 9/2008 | Yu | ..................... | G06F 17/30864 |
| 2009/0083327 | A1 * | 3/2009 | Ringham | ................ | G06Q 10/10 |
| 2009/0259670 | A1 * | 10/2009 | Inmon | ................ | G06F 17/2247 |
| 2010/0238180 | A1 * | 9/2010 | Kang | ..................... | G06T 13/00 345/473 |
| 2010/0303342 | A1 * | 12/2010 | Berg | ................ | G06F 17/30247 382/155 |
| 2011/0025883 | A1 * | 2/2011 | Shkurko | ................ | H04N 5/772 348/231.2 |
| 2012/0136864 | A1 * | 5/2012 | Ochtel | ............... | G06Q 30/0633 707/738 |
| 2014/0025682 | A1 * | 1/2014 | Okuma | ............. | G06F 17/30253 707/740 |
| 2014/0122479 | A1 * | 5/2014 | Panferov | ............... | G06F 3/0643 707/736 |
| 2014/0280148 | A1 * | 9/2014 | Stankiewicz | ........ | G06F 17/3071 707/737 |
| 2015/0032727 | A1 * | 1/2015 | Chung | ............... | G06Q 30/0251 707/722 |
| 2015/0170001 | A1 * | 6/2015 | Rabinovich | .......... | G06K 9/6267 382/110 |

* cited by examiner

*Primary Examiner* — Kim Vu
*Assistant Examiner* — Molly Delaney
(74) *Attorney, Agent, or Firm* — Fenwick & West LLP

(57) ABSTRACT

Embodiments process a recipe from structured data to extract recipe text and select an image representative of the recipe. Recipes in structured data are retrieved and sequenced into segments to facilitate further processing. A recipe parser generates features corresponding to the segments. These generated features are inputs to a recipe model to classify the segments into components. This recipe model is trained according to classified training recipes. The trained model may then determine classifications for segments of the recipe. The classified recipe text is used to select the representative image for the recipe. To select this image, candidate images for a recipe are retrieved and filtered to remove unacceptable images. Features corresponding to these candidate images are generated and used as inputs to an image model to select the representative image. This image model is trained using representative training images of training recipes.

20 Claims, 10 Drawing Sheets

US 9,311,568 B1

RECIPE TEXT AND IMAGE EXTRACTION

BACKGROUND

1. Field of Disclosure

This disclosure relates generally to parsing webpage content and more particularly to extracting recipe text from a webpage, as well as selecting a representative image of a recipe from images in a webpage containing a recipe.

2. Description of the Related Art

Computational parsers analyze strings of data to identify distinct tokens (e.g., words, numbers, images) in the text and to organize the identified tokens into a meaningful structure (e.g., sentences, paragraphs, lists). When combined with natural language processing techniques, parsing may be used to determine significance of tokens or relationships between tokens. Although these techniques have been applied to grammatical analysis of sentences, they are generally ill-suited to recognizing recipes in structured documents (e.g., webpages) and organizing them for further analysis or uniform presentation. For example, recipes in webpages may be difficult to analyze because various webpages organize recipes differently. Some webpages contain recipe formatting metadata that labels different components of recipes (e.g., title, ingredients, preparation steps). However, few recipes available online implement this recipe-specific formatting, so recipe formatting metadata is not useful for extracting recipes from most webpages.

Pattern recognition and computer vision focus on recognizing patterns in images. For example, facial recognition seeks to recognize an image subject's face across various images of the image subject. To recognize a face in an image, the image may be analyzed to detect facial structure or other characteristics (e.g., color). Unlike faces, food has no uniform structure or colors. Thus, conventional image processing techniques are ill-suited for distinguishing images of prepared food from images of ingredients or images unrelated to food.

SUMMARY

Embodiments select a representative image for a recipe from among various candidate recipe images. A recipe containing classified recipe text and candidate images is received. Image features are generated for the candidate images. Image features of a candidate image represent classified recipe text proximate to the candidate image or position of the candidate image within the recipe, for example. Image probabilities are determined using an image model, image feature weights, and the generated image features. The image feature weights may be computed based on training recipes containing classified training recipe text and training recipe images. The training recipe images include a representative training image. This representative training image depicts the finished product of a recipe. A representative image is selected from the candidate images according to a ranking of the determined image probabilities, and the selected representative image is stored in association with the retrieved recipe.

In one embodiment, a request for the recipe is received from a client device. In response to this request, the representative image and the classified recipe text may be transmitted to a client device for display. Candidate images may be filtered from the candidate images to remove candidate images according to a conditional test. For example, the conditional test enforces a threshold on image size, or the conditional test removes images from portions of the recipe outside of the body of the recipe.

In one embodiment, the method further includes producing the classified recipe text from a recipe extracted from a recipe source. Recipe sources may contain various webpages or other structured documents, not all of which contain recipes. The recipe server retrieves a candidate recipe from a recipe source, attempts to extract recipe content, and optionally verifies whether the candidate recipe indeed contains recipe content. A "candidate recipe," as used herein, refers to a retrieved structured document that may contain recipe content. If the candidate recipe is verified as a recipe, then the extracted recipe content is stored.

To extract recipe text from a candidate recipe and verify that the candidate recipe is a recipe, the source content of the recipe is classified. First, source content containing text and candidate images in a hierarchical structure or otherwise structured document is obtained. The source content is then sequenced into segments based on the hierarchical structure. These sequenced segments correspond to consecutive lines, paragraphs, sentences, or other groupings of text in a display presentation of the candidate recipe. Recipe features are then generated for the sequenced segments. These recipe features may represent text in a segment or position of the segment in the hierarchical structure of the text, for example. Using these recipe features, a recipe model classifies a segment as a recipe component. For example, a segment contains text corresponding to a recipe ingredient, a recipe preparation step, or a recipe title. The recipe model determines recipe component classifications using recipe feature weights computed based on training recipes including classified training recipe text. The recipe component classifications of the segments are stored as classified recipe text.

Embodiments include methods of selecting a representative image and extracting recipe text from a structured, hierarchical document. Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIGS.) and the following description describe certain embodiments by way of illustration only. One skilled in the art will readily recognize from the following description that alternative embodiments of the structures and methods illustrated herein may be employed without departing from the principles described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Recipe Extraction Environment

Figure 1:
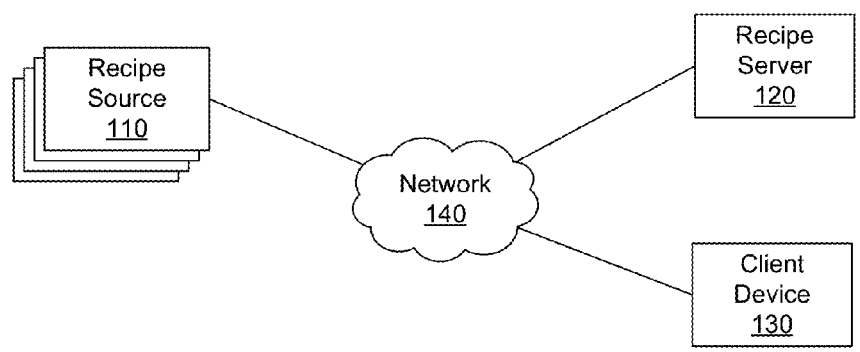
FIG. 1 is a high-level block diagram illustrating an environment for extracting recipes from a source, in accordance with an embodiment.

FIG. 1 is a high-level block diagram illustrating an environment 100 for extracting recipes from a source 110, in accordance with an embodiment. The environment 100 includes entities such as recipe sources 110, a recipe server 120, a client device 130, and a network 140. Although single instances of some of the entities are illustrated, multiple instances may be present. For example, multiple client devices 130 associated with multiple users may access recipes through the recipe server 120. The functionalities of the entities may be distributed among multiple instances. For example, a content distribution network (or a cloud-based network) of servers at geographically dispersed locations implements the recipe server 120 to increase server responsiveness.

A recipe source 110 is a repository of recipes accessible by the recipe server 120. In one embodiment, the recipe source 110 is a server hosting a webpage displaying recipes through a markup language (e.g., HTML) or another structured document format. A recipe source 110 may implement an application programming interface (API) functionality to provide recipe access to applications native to an operating system on a client device 130. The recipe source 110 may be implemented using a server, described further with respect to FIG. 10.

Alternatively or additionally, a recipe source 110 is a repository containing recipes in a structured document format. The repository may be a non-transitory computer-readable storage medium (e.g., a hard disk drive, an optical disc, a flash memory) accessible to the recipe server through the network 140 or through a removable storage media interface. Non-transitory computer-readable storage media are further described with respect to FIG. 10.

The recipe server 120 hosts recipes for display to the user of a client device 130. In one embodiment, the recipe server 120 retrieves recipes from a recipe source 110 and analyzes the recipes to enable more uniform presentation through client devices 130 and to enable more efficient organization of recipes. Optionally, the recipe server 120 organizes recipes to present relevant or recommended recipes to a user of a client device 130. For example, the recipe server 120 organizes recipes to accurately interpret source queries better than a generic text search algorithm. As another example, the recipe server 120 maintains a user profile to log a user's preferences, dietary restrictions, and culinary tastes. This user profile may be used to recommend items to the user and to increase relevance of search results to the user. The recipe server 120 is described further with respect to FIGS. 2-4.

The client device 130 accesses recipes through the network 140 and presents the accessed recipes to the user. In one embodiment, the client device 130 is a computer, which is described further below with respect to FIG. 10. Example client devices 130 include a desktop, a laptop, a tablet, a mobile device, a smart television, and a wearable device. Using the client device 130, a user may access recipes on the recipe server 120. Optionally, the user of a client device 130 may search through recipes on the recipe server 120 or request recipe recommendations from the recipe server 120. The client device 130 may contain software such as a web browser or another application for viewing recipes from the recipe server 120. The client device 130 may optionally access a recipe source 110 that displays recipes through a webpage or in another accessible form through the network 140.

The network 140 enables communications among the entities connected to it through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP). The network 140 may include multiple sub-networks linked to transfer data.

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

Recipe Server

Figure 2:
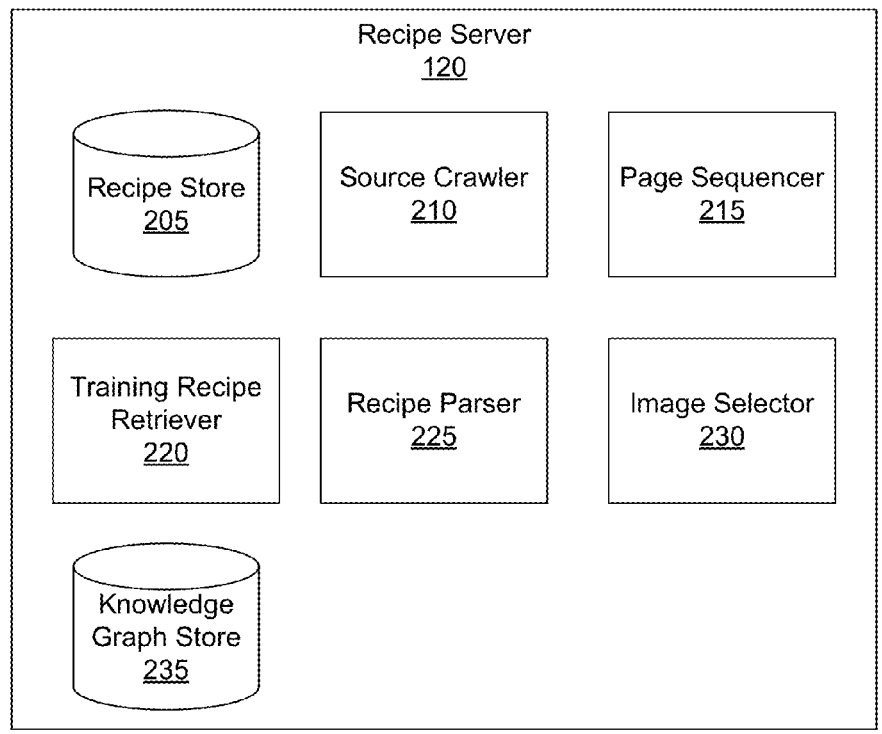
FIG. 2 is a block diagram illustrating a recipe server, in accordance with an embodiment.

FIG. 2 is a block diagram illustrating a recipe server 120, in accordance with an embodiment. The recipe server 120 includes a recipe store 205, a source crawler 210, a page sequencer 215, a training recipe retriever 220, a recipe parser 225, an image selector 230, and a knowledge graph store 235.

The recipe store 205 contains extracted recipes. An extracted recipe includes source content of a recipe (or a pointer thereto) and extracted recipe components. The source content of the recipe may be stored as a copy of the recipe from its origin recipe source 110, or a pointer to the recipe on the recipe source 110. The source content of the recipe includes text of the recipe as well as accompanying images or other media (e.g., video, animations). The extracted recipe components generally include the recipe's title, ingredients, and preparation steps as classified by the recipe parser 225, which is discussed in more detail below. The extracted recipe components also include a representative image, which depicts the finished product described by the recipe after preparation is complete. The extracted recipe components may optionally include additional recipe information such as number of servings, serving size, preparation time, or recipe author, for example. The recipe store 205 may also contain training recipes retrieved by the training recipe retriever 220. In one embodiment, the recipe server 230 uses extracted recipe components from the recipe store 205 to create a user interface for presentation on a client device 130. The user interface displays the representative image of the recipe along with the recipe's textual components such as its title, ingredients, and preparation steps.

The knowledge graph store 235 contains a graph representing food knowledge. An example section of the knowledge graph is provided in FIG. 11. The nodes of the graph represent ingredients, ingredient abstractions, cooking techniques, and cooking equipment. Example nodes of the graph include "apple," "Gala apple," "fruit," "slicing," "peeling," "knife," and "peeler." Ingredient abstractions are broader categories of ingredients. For example, "steak" is an abstraction of "rib-eye steak." A node may be an abstraction with respect to another node and an ingredient with respect to another node. For example, "beef" is an abstraction of "Wagyu beef," and "meat" is a further abstraction of "beef." Example nodes representing cooking techniques include "sautéing," "searing," and "sous vide." Example nodes representing cooking equipment include a "baking stone," a "mushroom brush," and "bamboo skewers." Similar to ingredients, a node representing a cooking technique or a piece of cooking equipment may be an abstraction of a cooking technique or a piece of cooking equipment. For example, nodes representing the cooking techniques "cutting" and "cooking" are abstractions of the cooking techniques "mincing" and "browning," respectively. As another example, a "baking container" is an abstraction of the cooking equipment "muffin pan" and "cookie sheet."

The nodes of the food knowledge graph may contain attributes of a particular object on the graph. For example, nodes representing ingredients contain nutritional density information and associated allergens and dietary restrictions. Nodes representing abstractions may similarly contain average nutritional density information as well as attributes (e.g., allergens such as gluten or nuts, dietary restrictions such as halal, vegan, or kosher) common to child ingredients of a parent abstraction. As another example, nodes representing cooking techniques and cooking equipment indicate difficulty of using cooking equipment or learning a cooking technique.

The edges of the food knowledge graph may indicate relationships between nodes of the graph. The food knowledge graph has different types of edges representing different relationships, and two nodes may be connected by more than one edge. For example, one type of edge explicitly indicates the parent-child relationship between an ingredient and an abstraction (e.g., "black beans are a kind of beans"). Another type of edge between two nodes representing two ingredients indicates that the ingredients have equivalent nutritional content (e.g., "a Fuji apple is the nutritional equivalent of a Gala apple"). Edges may connect similar nodes, such as an edge representing substitutability between ingredients represented by two nodes. An edge between a node representing an ingredient and a node representing cooking equipment or a cooking technique indicates that the cooking equipment or technique is commonly used with that ingredient (e.g., "potatoes are often used with ovens," "potatoes are often baked"). Similarly, an edge between a node representing a cooking technique and a node representing cooking equipment indicates that the cooking equipment may be used in a cooking technique (e.g., "an oven is used for baking").

In addition to ingredients, abstractions of ingredients, cooking techniques, and cooking equipment, the knowledge graph 235 may contain nodes representing units of measure (e.g., cup, ounce, cubic centimeter, pinch). These nodes may have attributes indicating common abbreviations of the unit of measure, and edges between these nodes may represent unit conversions between dimensionally consistent units of measure. Hence, the nodes, attributes of nodes, and edges between nodes serve to organize food knowledge. The recipe parser 225 and image selector 230 access the knowledge graph store 235 to generate features to classify recipe text or to select a representative image for a recipe.

The source crawler 210 identifies candidate recipes from structured documents (e.g., webpages) of the recipe source 110 and retrieves them. In one embodiment, the source crawler 210 obtains domain names of webpages that may contain recipes. For example, the source crawler 210 obtains domain names from a manually input list of domain names, or the source crawler 210 searches for food-related terms in a general-purpose search engine and obtains domain names from the search results. The source crawler 210 accesses or generates a site map of accessible webpages at the domain name and traverses the sitemap to retrieve structured documents from the accessible webpages.

From the structured documents retrieved by the source crawler 210, the page sequencer 215 processes the source content into a sequence of segments. The sequenced segments generally contain text visible to a user, but a sequenced segment may include an image or other media. A sequenced segment typically corresponds to a line of text or a paragraph of text. For example, text in separate paragraph nodes is sequenced into separate segments, and two blocks of text in a paragraph node may be sequenced into separate segments if there is a line break between the two blocks of text. The sequence of segments also preserves a relative ordering between segments corresponding to their displayed ordering on the page. In one embodiment, the page sequencer 215 flattens a document object map (DOM) of the structured document and may discard selected metadata not considered by the recipe parser 225 or image selector 230 (e.g., metadata in a header of the structured document). Segments may contain multiple leaves of the DOM. For example, a line contains DOM leaves corresponding to differently formatted words in the line, but the page sequencer 215 groups these DOM leaves into one segment. Generally, line breaks or paragraph breaks correspond to a division between segments. Hence, the page sequencer 215 produces a sequence of segments containing content of a candidate recipe for classification by the recipe parser 225.

The training recipe retriever 220 obtains a set of training recipes and stores these training recipes in the recipe store 205. Training recipes include the original content of the recipe, the recipe's classified components, and a representative image. The training recipe retriever 220 retrieves recipes containing recipe formatting metadata, which labels recipe components. Example recipe formatting metadata labels the recipe's title, ingredient block, and preparation steps. Alternatively or additionally, the training recipe retriever 220 includes an interface to facilitate manual classification of recipes by a user.

The recipe may also be associated with metadata indicating a preview image (e.g., for a preview thumbnail when shared on a social networking platform). In one embodiment, the training recipe retriever 220 uses the metadata indicating the preview image to determine the representative training image. Alternatively or additionally, the training recipe retriever 220 includes an interface to facilitate manual selection of a representative training image depicting the completed recipe. Using the training recipes obtained by the training recipe retriever 220 and the sequenced segments of a candidate recipe, the recipe parser 225 determines recipe component classifications for the sequenced segments. In one embodiment, the recipe parser 225 creates a recipe model of recipe component classifications to predict recipe component classifications of training recipes from the training recipe retriever 220. To create the recipe model, the recipe parser 225 generates recipe features representing the segments of text and the source content of the candidate recipe. The recipe parser 225 may also determine, based on the recipe component classifications of the candidate recipe, whether the candidate recipe is a recipe by comparison of a measure of confidence to a threshold confidence. If the candidate recipe is determined to be a recipe, the recipe parser 225 stores the recipe classifications in the recipe store 205. The recipe parser 225 is described further in conjunction with FIG. 3.

Using the training recipes obtained by the training recipe retriever 220, the classified recipe components of a recipe from the recipe store 205, and the source content of the recipe, the image selector 230 selects a representative image from the candidate images of a recipe. In one embodiment, the image selector 230 creates an image model that predicts the representative training images for training recipes from the training recipe retriever 220. To create the image model, the image selector 230 generates image features representing characteristics of candidate images and their relationship to other candidate images. The image selector 230 evaluates the candidate images using the image model, selects a representative image based on a ranking of candidate images, and stores the selected representative image in the recipe store 205 in conjunction with the recipe. The image selector 230 is described further in conjunction with FIG. 4.

Recipe Parser

Figure 3:
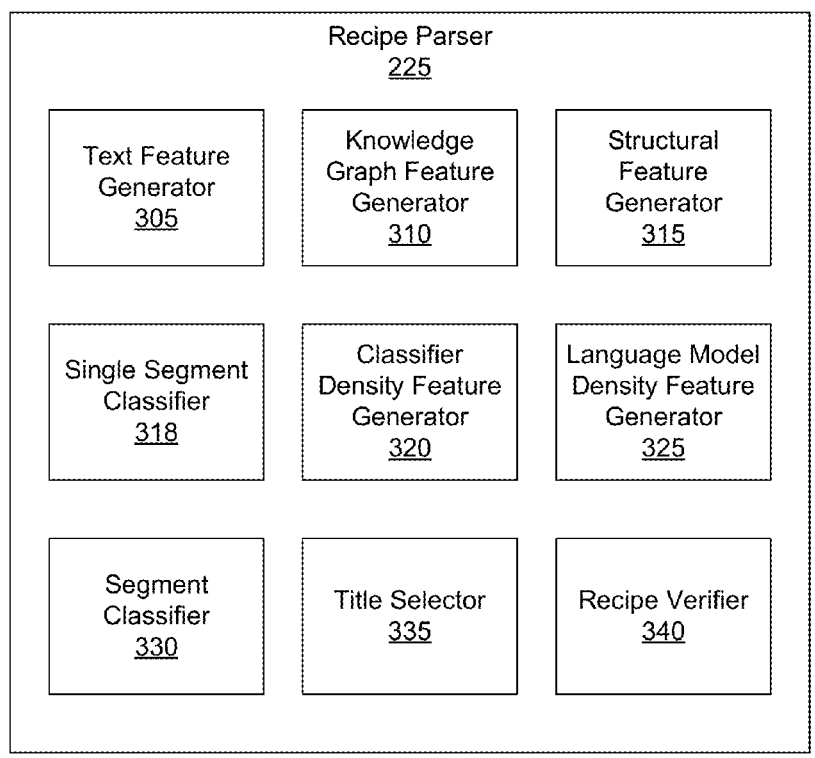
FIG. 3 is a block diagram illustrating a recipe parser, in accordance with an embodiment.

FIG. 3 is a block diagram illustrating a recipe parser 225, in accordance with an embodiment. The recipe parser 225 includes a text feature generator 305, a knowledge graph feature generator 310, a structural feature generator 315, a single segment classifier 318, a classifier density feature generator 320, a language model density feature generator 325, a segment classifier 330, a title selector 335, and a recipe verifier 340.

Features for a Recipe Model

The recipe parser 225 generates various recipe features with the feature generators 305, 310, 315, 320, and 325. A recipe feature has values for a segment of the sequenced candidate recipe based on properties or characteristics of that segment, neighboring segments in the sequence, segments otherwise related to the segment based on the structured document containing the candidate recipe. Using the recipe features from these generators (or a subset thereof), the segment classifier 330 determines recipe component classifications.

The text feature generator 305 generates recipe features for a segment based on textual content of a segment. In one embodiment, the text feature generator 305 generates features based on a characteristic of the text such as a word, a phrase, letter case, textual formatting, and a regular expression occurring in the text of a segment. A given feature may have a binary value indicating presence of one of the characteristics in the text, or a numerical value (e.g., the number of instances of the characteristic in the segment of text). For example, the words "alla" and "with" are common in recipe titles, and the phrases "until melted" or "until it cools" are common in preparation steps. Regular expressions provide for a more flexible way to generate features based on patterns in text. For example, the regular expressions "from # to # seconds" or "from # to # minutes," where "#" is a number having one to three numerical digits, may often be found in preparations steps. As another example, the regular expression of a period followed by one or two spaces and then a capital letter indicates a break between sentences, which is most typically found in recipe preparation steps. As a further example, the regular expression "serves #," where "#" is one or two numerical digits indicates a servings recipe component. As an example of a feature based on text case, a feature counts the number of capital letters in a text segment relative to the number of spaces; a high value of this feature may correlate with a title recipe component. As a final example, a recipe feature may correspond to formatting metadata contained in a textual segment. Hence, the text feature generator 305 generates features corresponding to various characteristics of a segment's text.

The knowledge graph feature generator 310 generates recipe features based on matches between text in segments and the knowledge graph from the knowledge graph store 235. Generally, a recipe feature based on the knowledge graph may be a binary value indicating presence of a type of data found in the knowledge graph or a numerical value indicating a count (or density) of a type of data found in the knowledge graph. For example, a feature indicates the number of known ingredients in the text of the segment. One or two ingredients in a segment may correlate to a segment representing an ingredient in an ingredient list, while additional ingredients may correlate to a segment representing a preparation step. As another example, a feature indicates the density of preparation techniques in the text of the segment, which correlates with the segment representing a preparation step. A feature indicating a known attribute of an ingredient (e.g., nutritional information, allergy information, an associated holiday) may indicate that the segment does not correspond to a recipe component, for example, but rather an informational or subjective description of the recipe. Hence, the knowledge graph feature generator 310 generates features corresponding to correlations between the knowledge graph and text in a segment.

The structural feature generator 315 generates recipe features based on a sequence's position in the structured document containing the candidate recipe. In one embodiment, the structural feature generator 315 analyzes a segment's position in the DOM with respect to neighboring nodes. A recipe feature may indicate the distance in the DOM between a segment and neighboring segment (e.g., the preceding segment, the subsequent segment, a non-immediate neighbor segment). The distance in the DOM, for example, might be the number of nodes in a graph representation of the DOM between nodes representing the segments or the number of hierarchy levels to a common ancestor node of the segment and its neighbor segment. If two segments that are adjacent in the sequence have the same parent (i.e. immediate ancestor) node, then the two segments are likely to both have the same recipe component classification (e.g., ingredient list or preparation step).

In addition to features based on positional relationships between a segment and its neighbor segments, the structural feature generator 315 generates recipe features based on characteristics of the segment in the structured document as well as segments related to the segment. For example, if a segment's node (in the DOM) corresponds to a paragraph, then that segment is more likely to correspond to preparation steps. Features may correspond to a characteristic or property of an ancestor node (in the DOM) of a segment. If the ancestor node of a segment corresponds to a bulleted list, then that segment is more likely to correspond to an ingredients list. Hence, the structural feature generator 315 generates recipe features corresponding to properties of segments in the structured document as well as the relationship between neighboring segments in the structured document.

The single segment classifier 318 determines the probability that a single segment is classified as a given recipe component. The classifier density feature generator 320 uses this probability of recipe component classification to generate features. In one embodiment, the single segment classifier 318 is a machine learning algorithm (e.g., logistic regression) that trains using the training recipes from the training recipe retriever 220. The single segment classifier 318 uses recipe features applicable to a single segment of text (e.g., features from the text feature generator 305, the knowledge graph feature generator 310, and the language model density feature generator 325). For example, the machine learning algorithm predicts probabilities that a segment, when considered in isolation, is an ingredient or a preparation step. Generally, the single segment classifier 318 is a simpler version of the segment classifier 330, which considers relationships between neighboring segments to determine recipe component classifications, as described in further detail below.

Using the probabilities of recipe component classification output by the single segment classifier 318, the classifier density feature generator 320 generates features that represent the average probabilities of recipe component classification for neighboring segments. For example, if a segment's neighbors have a high probability of containing preparation steps (as determined by the single segment classifier 318), then that segment also has a high likelihood of containing preparation steps. In one embodiment, the classifier density feature generator 320 selects a window around a segment containing various numbers of segments. The window may include preceding and/or subsequent segments. Example windows include (1) a segment and four preceding segments, (2) a segment and two preceding and two subsequent segments, and (3) a segment and two subsequent segments. The classifier density feature generator 320 generates features averaging the probabilities of recipe component classification (from the single segment classifier 318) over a window around the segment. The given window of segments may include only the segment, so the corresponding feature would have a value equal to the probability of recipe component classification from the single segment classifier 318. Hence, the classifier density feature generator 320 computes recipe features representing a trailing, centered, or forward moving average of probabilities from the single segment classifier 318 over a certain number of segments around a segment.

The language model density feature generator 325 generates recipe features based on text in segments and based on the knowledge graph from the knowledge graph store 235 using regular patterns of occurrence. In one embodiment, the language model density feature generator 325 generates recipe features using language models based on text of classified recipes. A language model of a segment of text indicates the probability that the sequence of text is a given recipe component. For example, a language model takes the text "cut the pears into quarter-inch cubes" and assigns probabilities that the text corresponds to an ingredient line or a preparation step based on recipes containing this text. The language model uses the knowledge graph to broaden a language model from a particular food-related term (e.g., "walnut") to a category of food-related terms (e.g., <ingredient>, <nut ingredient>). For the previous example, the language model density feature generator 325 recognizes that "cut" is a cooking technique, that "pears" are an ingredient, that "quarter" is a number, and that "inch" is a unit of measurement. Thus, the language model determines the probabilities of segment classification for the phrase "<cooking technique> the <ingredient> into <#> <unit of measure> cubes." The language model density feature generator 325 generates features each corresponding to (1) a language model and (2) a given recipe component. The value of a generated feature reflects the probability that a segment has a recipe component classification given the presence (or number of occurrences) of text fitting the language model. By using the knowledge graph, the language model density feature generator 325 increases the number of known recipe components (from classified recipes) that fit a given language model, increasing the predictive utility of a feature generated based on that language model.

Example language models include n-grams containing terms from the knowledge graph store 235. An n-gram is a contiguous sequence of n words or phrases encapsulating a typical phrase found in a recipe. Although similar to a regular expression, an n-gram makes use of prior knowledge from the knowledge graph. For example, the tetra-gram "<number> <measure> of <ingredient>" represents textual phrases having a numerical value, followed by a unit of measure, the word "of," and an ingredient found in the knowledge graph store 235. Specific tetra-grams having this format include "5 dollops of salt" or "10 gills of lutefisk." Features representing instances of this example tetra-gram may predict segments representing ingredient lists. The language model density feature generator 325 may normalize occurrences of text fitting a language model by the amount of text in a segment. This normalization may account for prevalence (or density) of text fitting a language model. For example, long subjective descriptions of a recipe may contain text fitting a language model that suggests the segment is an ingredient, but the low prevalence of text fitting the language model relative to the amount of text in the segment reduces probability of misclassifying the segment as an ingredient.

Segment Classifier

Using the generated recipe features, the segment classifier 330 determines recipe component classifications from a recipe model. In one embodiment, the segment classifier 330 uses a machine learning algorithm such as inference on a conditional random field or logistic regression. The segment classifier 330 determines weights for the recipe model based on training recipes from the training recipe retriever 220. The source content of the recipe is processed into a sequence of segments by the page sequencer 215, and the feature generators 305, 310, 315, 320, and 325 generate recipe features from the sequence of segments for the training recipe. The features generated for the training recipe are the input to the recipe model. The expected outputs of the recipe model are the classified recipe components of the training recipe.

The segment classifier 330 determines weights that minimize an objective function representing deviation between the output of the recipe model and the expected output of the recipe model. The objective function, for example, may be a number of incorrectly classified recipe segments for training recipes or a sum of errors squared between the expected output of the recipe model from training recipe component classifications and the output computed using the weights for those training recipes. As another example, the objective function is the conditional log-likelihood of the training recipes. Alternatively, the segment classifier 330 determines weights to maximize an objective function representing probability of correctly classifying a recipe component.

Optionally, the objective function may contain a regularizer term to avoid over-fitting of data. For example, a L1 regularizer adds the sum of the weights' magnitudes (i.e., the L1 norm, or taxicab distance of a vector of the weights from the origin) to the objective function. Performing L1 regularization (or some other regularization) may result in some features receiving a weight of zero (or a substantially negligible weight). Such features having a weight of zero (or a weight below a threshold) may be omitted from the recipe model, which beneficially reduces computational time to subsequently classify candidate recipes.

Once weights are determined, the segment classifier 330 may classify a candidate recipe using the determined weights, the recipe model, and the generated features. In one embodiment, the recipe model outputs probabilities corresponding to different possible recipe component classifications for a segment. The segment classifier 330 selects the recipe component classification with the highest probability as that segment's recipe component classification, subject to the probability of the recipe component classification being greater than or equal to a minimum threshold for component classification. Some segments are explicitly classified as not being a recipe component because none of their probabilities of classification as a recipe component exceed a minimum threshold for component classification. Alternatively, these segments do not receive a recipe classification. These segments may correspond to subjective or supplementary description of a recipe, information about the author, or titles of related recipes, for example. In one embodiment, the segment classifier 330 selects a set of recipe component classifications for the sequence of segments as the set of recipe component classifications that has a maximum probability according the recipe model. For example, the segment classifier 330 implements one or more dynamic programming-based inference algorithms to determine recipe component classifications of the sequence of segments.

In one embodiment, the segment classifier 330 determines probabilities for classification labels of segments. These classification labels serve as an intermediate step between a segment and the segment's recipe component classification. Example classification labels may indicate the segment is the beginning of a recipe component, a continuation of a recipe component, or an end of the recipe, for example. These classification labels improve accuracy because the first instance of a recipe component (following a recipe component having a different classification) may tend to have different feature values than a subsequent instance of a recipe component (following a recipe component having the same classification). The last segment before a label indicating the beginning of recipe component is implicitly labeled as the end of the previous recipe component provided there is a previous, corresponding label indicating the beginning of recipe component. The recipe title, serving size, and preparation time typically are encountered in an individual segment without another recipe title, serving size, or preparation time present, so this segment receives a classification label indicating that the segment is the beginning of a recipe title, serving size, or preparation time component, respectively. The ingredient list may span multiple segments. The first of these segments indicates the beginning of the ingredient list, and the subsequent segments indicate a continuation of an ingredients list. Similarly, the preparations steps may encompass multiple segments with labels indicating the beginning and continuation of the preparation steps. The end of recipe label indicates the last segment having content classified as belonging to the extracted recipe. Typically, the preparation steps are the last recipe components in the sequence, so the last segment corresponding to a preparation step may be labeled as the end of the recipe. Thus, a recipe's component classifications may be logically determined from the example labels.

If the segment classifier 330 uses inference on a conditional random field, then the segment classifier 330 implements transition features. A transition feature for a segment depends on the classification of a segment and the classification of a segment preceding that segment. These transition features may enforce expectations about the ordering of recipe components within the recipe. For a recipe having classification labels as described previously, transition features enforce an expected sequence of labels. For example, a first binary transition feature indicates whether a segment classified as a serving size is preceded by a segment classified as a title or a preparation time. As a second example, a binary transition feature indicates whether a segment labeled as the beginning of a preparation step is preceded by a segment classified as a part of an ingredient list. A third example binary transition feature indicates whether a segment labeled as a continuation of an ingredient list is preceded by a segment labeled as the beginning of an ingredient list or a continuation of an ingredient list. These example binary transition features enforce an expectation that the recipe components occur in a sequence corresponding to title first, serving size or preparation time second, ingredient list third, and preparation steps last. This example describes one possible ordering of recipe components as well as transition features to enforce that ordering. The segment classifier 330 may recognize additional alternative orderings including fewer or additional types of recipe components.

In one embodiment, the segment classifier 330 incorporates additional deterministic constraints. These deterministic constraints may be logical rules that override probabilities of recipe component classification determined by the recipe model based on the text or other content in a segment. For example, segments starting with the word "For" or ending with a colon ":" do not typically contain ingredients or preparation steps. One example constraint would set the probability to zero that a segment containing this phrase is an ingredient or a preparation step. Example rules typically do not set the probability of the segment as having a particular classification to one because the segment may correspond to non-recipe content (e.g., author commentary on the recipe).

For example, the segment classifier 330 implements the recipe model using inference on a conditional field with dynamic programming (e.g., the Viterbi algorithm, the forward-backward algorithm). In the example implementation, the segment classifier 330 constructs arrays with rows that correspond to component classifications and columns that correspond to segments. For an example implementation with the Viterbi algorithm, the value of an entry in the array corresponds to the maximum score of all classification sequences that end at the segment with the classification corresponding to that entry. To implement deterministic constraints in this example, some entries receive a value specified by the deterministic rule. For example, if the text of a segment begins with "For," then the entries are set to zero in the column corresponding to that segment and the rows representing classifications as an ingredient or a preparation step. Setting an entry to zero ensures that the segment classifier 330 assigns zero probability to a classification sequence that violates a deterministic constraint during inference.

Using the classified recipe components of the candidate recipe from the segment classifier 330, the title selector 335 selects a title. It is possible for the segment classifier 330 to classify more than one segment as a title, so the title selector 335 selects the text of one of these segments as the title. In one embodiment, the title selector 335 uses probabilities of recipe component classification computed by the segment classifier 330. This probability of recipe component classification may be adjusted by heuristics. For example, the probability of a recipe is adjusted downwards based on the number of segments between a segment classified as a recipe title and the first segment classified as a part of the ingredients list. Hence, the title selector 335 optionally disambiguates from multiple possible titles identified by the segment classifier 330.

Using the classified recipe components of the candidate recipe from the segment classifier 330, the recipe verifier 340 determines whether the candidate recipe is a recipe. The recipe verifier 340 may check for presence of one or more features (e.g., title, ingredients list, preparation steps) and determine that the candidate recipe is not a recipe if one of these is missing. The recipe verifier 340 may also compute an aggregate probability that the candidate recipe is a recipe using the probabilities of recipe classification for the classified segments. If the recipe verifier 340 determines that the candidate recipe is a recipe, then the recipe and its recipe component classifications are stored in the recipe store 205. In one implementation, the recipe parser 225 correctly determines that a candidate recipe is a recipe for eighty-seven percent of candidate recipes. In this implementation, if the recipe parser 225 identifies a candidate recipe as a recipe, then the recipe parser 225 correctly extracts the ingredients, preparation steps, title, servings, and preparation time from the recipe ninety-six percent of the time.

Image Selector

Figure 4:
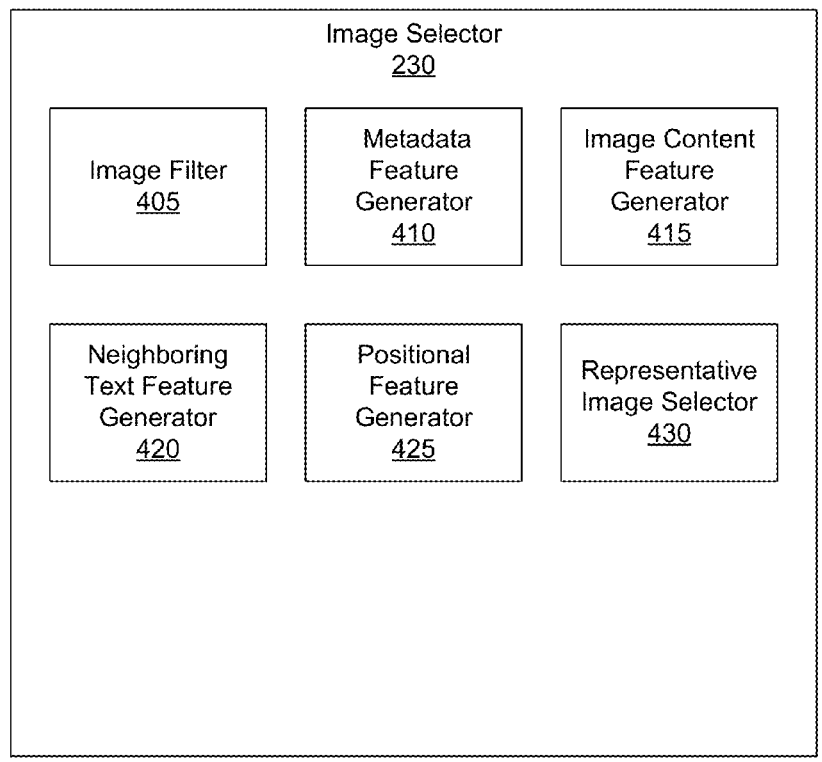
FIG. 4 is a block diagram illustrating an image selector, in accordance with an embodiment.

FIG. 4 is a block diagram illustrating an image selector 230, in accordance with an embodiment. The image selector 230 includes an image filter 405, a metadata feature generator 410, an image content feature generator 415, a neighboring text feature generator 420, a positional feature generator 425, and a representative image selector 430.

The image filter 405 receives candidate images associated with a recipe and removes candidate images that fail to pass one or more conditional tests. These conditional tests screen out candidate images that would be unsuitable as a representative image. The image filter 405 may include filters based on image quality (e.g., size, resolution) or filters based on image position within the structured document. For example, candidate images having less than a threshold number of pixels are filtered. In one embodiment, the image filter 405 uses the position of an image within the DOM of the structured document. For example, images with DOM ancestor nodes outside the body of the structured document are filtered. In other words, the image filter 405 removes images in headers, footers, and sidebars of a page.

Features for an Image Model

The remaining candidate images that pass the image filter 405 are analyzed by the feature generators 410, 415, 420, and 425 to generate image features. An image feature has a value for a given candidate image based on properties or characteristics of that image. Using the image features from these modules (or a subset thereof), the representative image selector 430 selects a representative image from the candidate images. In one embodiment, duplicate image features are generated corresponding to various recipe sources 110. These duplicate, source-specific image features account for source-specific regularities. For example, a recipe source 110 generally puts a representative image in a consistent position relative to classified recipe segments or relative to another component of a structured document containing a recipe.

The metadata feature generator 410 generates image features for a candidate image based on metadata of a candidate image. In one embodiment, the metadata feature generator 410 generates features based on a word, a phrase, or a regular expression occurring in metadata text associated with an image. The metadata of an image is non-displayed information describing an image in a webpage. Example image metadata includes a title, an alternative text, or a filename of the image. For example, an image feature has a binary value corresponding to whether the image metadata includes a word or phrase such as "all done," "complete," "yummy," or "final product." The image feature metadata generator 410 may generate a feature indicative of a match between the title of the retrieved recipe and the metadata of the image. For example, an image feature counts the number of appearances of words from the title in metadata of the image. Hence, the metadata feature generator 410 generates image features corresponding to text associated with an image.

The image content feature generator 415 generates image features based on the image content of a candidate image. In one embodiment, the image content feature generator determines image features with values reflecting color histograms of an image. A color histogram indicates relative prevalence of different colors in a candidate image, which can be used to help distinguish images of food from other types of images, such as advertisements. For example, the histogram may indicate the average intensity of light from the image over various light wavelengths. Such features might be useful for detecting featureless images (an image with very few colors) or for detecting images with a dominant color (e.g., an image having a histogram with a strong peak around a certain wavelength of light among moderate intensity for wavelengths representing other colors). Features may be based on one or more colors of a histogram. For example, images that contain more than a threshold percentage of neon green are unlikely to be an image of food. Features may be based on a comparison of a candidate image's histogram to an aggregation of image histograms from candidate images. For example, if an image's histogram differs substantially from a mean histogram, then the image is unlikely to be an image of food. This feature reflects that candidate images showing a recipe in various steps of preparation tend to have the same colors while advertisements may be visually different from the other images in a recipe.

In one embodiment, the image content feature generator 415 generates features based on object recognition algorithms. For example, if a candidate image contains a face, a car, or a person, then that candidate image is unlikely to be the representative image of the recipe. The image content feature generator 415 may generate image features based on a histogram of oriented gradients, which divides an image into regions, determines the gradients of edges in those regions, and aggregates the gradients into a histogram. Features generated based on a histogram of oriented gradients may improve detection of non-food images, which are not chosen as a representative image. Additionally, the image content feature generator 415 generates features representative of image quality. Such features may represent an image's size, contrast, or pixel density, for example. Hence, the image content feature generator 415 uses the image data in a candidate image to determine image features.

The neighboring text feature generator 420 generates image features for a candidate image based on text located near to a candidate image. In one embodiment, the neighboring text feature generator 420 uses text from sequenced segments nearby an image, but alternatively, text may be extracted from the source content. The neighboring text may be before or after the image and may optionally include text proximate to a candidate image. Similar to the metadata feature generator 410, the neighboring text feature generator 420 generates image features based on a word, a phrase, or a regular expression occurring in the text near an image. For example, image features have binary values indicative of whether a word or phrase such as "yum," "all done," "la voila," or "bon appetit" appears in text located near the candidate image. The neighboring text metadata generator 420 may also generate an image feature indicative of a match between the title of the retrieved recipe and the neighboring text of the image. For example, an image feature counts the number of appearances of words from the title in neighboring text of the image. Hence, the neighboring text feature generator 420 uses displayed text near a candidate image to generate image features.

The positional feature generator 425 generates image features for a candidate image based on the image's position in relation to the recipe. In one embodiment, the positional feature generator 425 determines the image's position within the recipe relative to other images. For example, image features represent a candidate image's rank relative to the number of images, where the images may be ranked from first to last and last to first. Other example image features may correspond to whether an image is first or last. These features may be useful because images depicting the final product of a recipe often occur at the end or at the beginning of the recipe.

The positional feature generator 425 may also determine an image's position relative to classified recipe components. For example, a feature reflects whether an image occurs between two segments classified as a part of an ingredients list. Such a candidate image likely portrays ingredients of the recipe rather than the finished product. As another example, an image feature indicates whether the candidate image occurs before the beginning of an ingredients list. Images occurring before an ingredients list often show the finished product. Hence, the positional feature generator 425 uses a candidate image's position among other images and position relative to nearby classified recipe segments to generate image features.

Representative Image Selector

Using the generated image features, the representative image selector 430 determines a representative image for a recipe from candidate images that pass the image filter 405. In one embodiment, the representative image selector 430 uses a machine learning algorithm such as logistic regression. The representative image selector 430 determines weights for an image model based on training recipes from the training recipe retriever 220. The candidate images are retrieved from the source content of the recipe, and the feature generators 410, 415, 420, and 425 generate image features using these candidate images and the classified recipe components of the training recipe. The image features generated for the training recipe are the input to the image model. The expected output of the image model is the representative training image of the training recipe. For example, the image model outputs a high probability that the representative training image is the representative image. The expected probability for other candidate images from the training recipe should be low.

The representative image selector 430 determines weights that minimize (or alternatively maximize) an objective function representing deviation between the output of the recipe model and the expected output of the recipe model. The objective function, for example, may be the number of incorrectly output candidate images by the image model for candidate images of the training recipes given the representative training image of those training recipes. Another example objective function is a sum of errors squared between the expected output of the recipe model given the representative training image and the output representative image determined using the weights for those training recipes. As another example, the objective function is the conditional log-likelihood over the training recipes. Alternatively, representative image selector 430 determines weights to maximize an objective function representing probability of correctly selecting a candidate image as a representative image.

Optionally, the objective function may contain a regularizer term to avoid over-fitting of data. For example, a L1 regularizer adds the sum of the weights' magnitudes (i.e., the L1 norm, or taxicab distance of a vector of the weights from the origin) to the objective function. Performing L1 regularization (or some other regularization) may result in some image features receiving a weight of zero (or a substantially negligible weight). Such image features having a weight of zero (or a weight below a threshold) may be omitted from the image model, which beneficially reduces computational time to subsequently select a representative image for a recipe.

Once weights are determined, the representative image selector 430 may select a representative image from candidate images of a recipe outside of the training recipes using the determined weights, the image model, and the generated features for the candidate images. In one embodiment, the image model outputs probabilities corresponding to a candidate image's probability of being the representative image for the recipe. The representative image selector 430 selects the candidate image with the highest probability, subject to the probability being greater than or equal to a minimum threshold to be a representative image. In one implementation, the representative image selector 430 identifies the representative training image of a candidate recipe as the representative image for ninety percent of recipes.

Example Recipe

Figure 5:
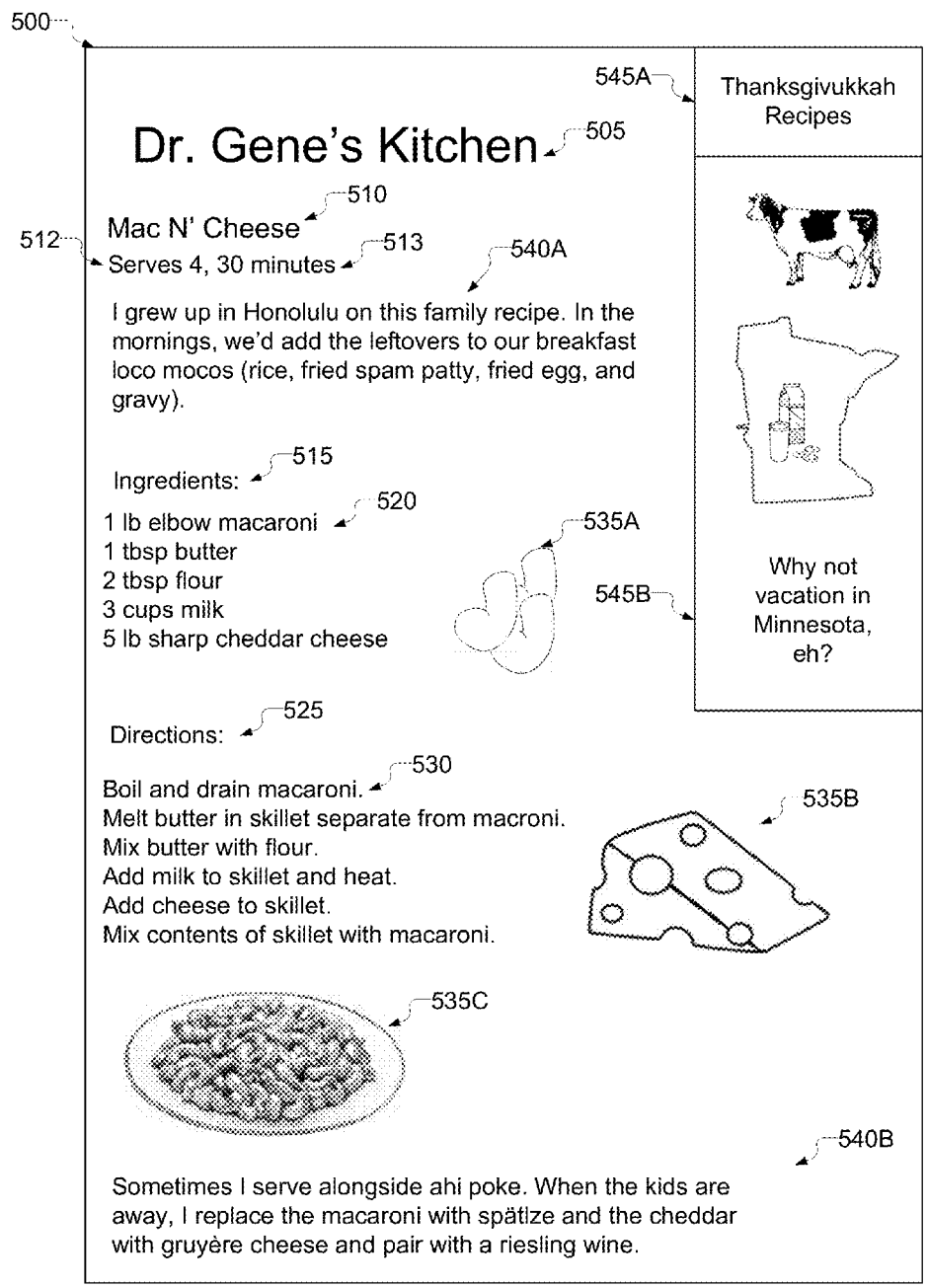
FIG. 5 illustrates an example recipe from a recipe source with example recipe component classifications, in accordance with an embodiment.

FIG. 5 illustrates an example recipe 500 from a recipe source 110 with example recipe component classifications, in accordance with an embodiment. The example recipe includes header text 505 and a recipe title 510. The recipe model differentiates between segments containing ingredients (e.g., cheese) from the knowledge graph, so the recipe parser 225 correctly classifies the recipe title 510 and identifies that the header text 505 is not a recipe component. The recipe parser 225 may also recognize the number of servings 512 and the preparation time 513 because they are located after the recipe title 510, and they contain phrases associated with these respective recipe components. The ingredients header 515 is positioned where the beginning of the ingredients list is expected, but recipe features representing language model density are weighted to reduce the probability of the ingredients header 515 being classified as part of the ingredients list. The segments of the ingredients list 520, by contrast, contain tri-grams characteristic of ingredients as well as ingredients known to be in the food knowledge graph. Additionally, each line of the ingredients list 520 contains a common ancestor node in the DOM tree, which is characteristic of ingredient lines. The directions header 525 is situated in a location after the end of the ingredients list 520, consistent with the beginning of the preparations steps. However, the directions header 525 does not contain characteristic words or phases of preparation steps. The preparation steps 530 contain ingredients as well as cooking techniques and cooking equipment contained in the knowledge graph, so the recipe parser 225 may correctly interpret these as recipe preparation steps. The recipe also includes non-recipe descriptive language 540A and 540B, which may occur before a recipe begins, in the middle of the recipe (540A), or after the recipe (540B). The recipe parser 225 classifies segments corresponding to descriptive language 540A and 540B as being non-recipe components. The recipe parser 225 may differentiate between recipe components and descriptive language 540 in part because descriptive language contains a lower density of terms in the knowledge graph and of text fitting a language model (relative to the number of words in the descriptive language 540.

The example recipe 500 also includes candidate images 535A, 535B, and 535C. Out of these candidate images 535, the image selector 230 selects image 535C as a representative image. Various features may bias the probability of image 535C being the representative image over the other candidate images 535A and 535B. For example, the candidate images 535A and 535B are located in the middle of the ingredients list and preparation steps, respectively, so image features representing their position are weighted to reduce their probability of being a candidate image. Additionally, the representative image 535C is last among the candidate images, so image 535C is associated with a feature corresponding to an image feature weighted to increase the probability of being selected as the representative image. The recipe may include sidebar content 545 such as a link to other recipes from the recipe source 110 (e.g., 545A) or an advertisement (e.g., 545B). The image filter 405 removes images from sidebar content 545 from consideration as a representative image, and the page sequencer 215 may omit sidebar content 545 when sequencing a candidate recipe.

Extracting a Recipe from a Source

Figure 6:
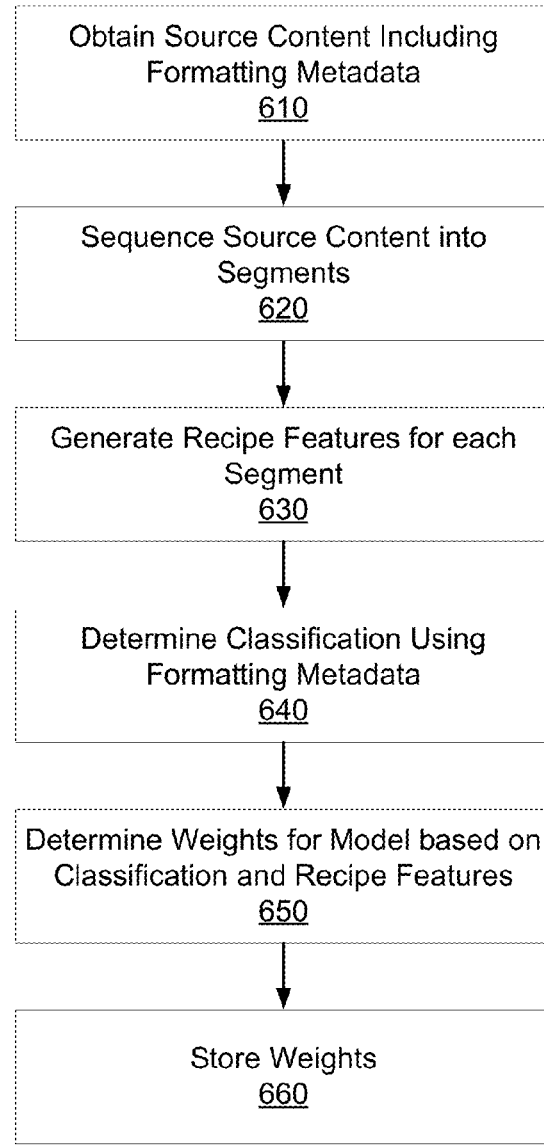
FIG. 6 is a flowchart illustrating a method of training a recipe model used to extract classified recipe text from a recipe, in accordance with an embodiment.

FIG. 6 is a flowchart illustrating a method of training a recipe model used to extract classified recipe text from a recipe, in accordance with an embodiment. The training recipe retriever 220 obtains 610 source content of a training recipe from a recipe source 110. The obtained source content of the recipe includes recipe formatting metadata labeling recipe components of the source content. The page sequencer 215 sequences 620 the source content into segments of text. For each segment, the feature generators 305, 310, 315, 320, and 325 generate 630 recipe features based on properties of the segment and surrounding segments. The generated recipe features are the input for the recipe model. The training recipe retriever 220 determines 640 recipe component classifications corresponding to segments using the formatting metadata of the obtained source content. These recipe component classifications of segments are the expected output of the recipe model. The segment classifier 330 then determines 650 weights for the recipe model to minimize the discrepancy between the expected outputs (the training classification for the segments) and the outputs of the recipe model for the inputs (the recipe features). These determined weights are stored 660 for use in extracting a recipe from a structured document containing the candidate recipe.

Figure 7:
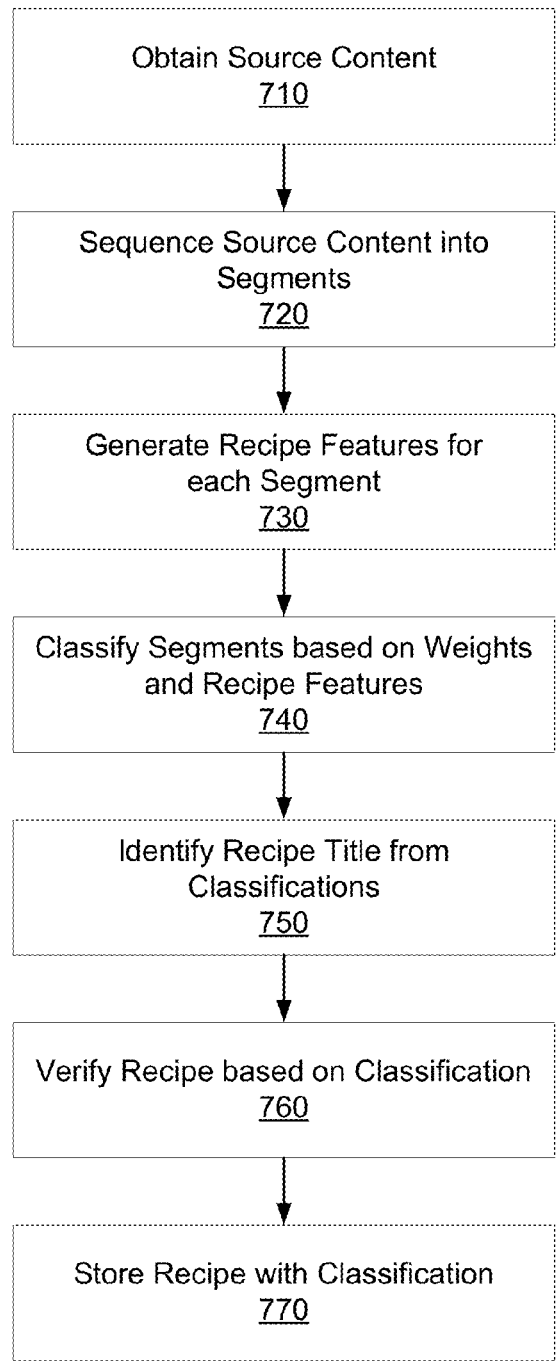
FIG. 7 is a flowchart illustrating a method of extracting classified recipe text from a recipe using a trained recipe model, in accordance with an embodiment.

FIG. 7 is a flowchart illustrating a method of extracting classified recipe text from a recipe using a trained recipe model, in accordance with an embodiment. The source crawler 210 obtains 710 source content of a structured document containing a candidate recipe from a recipe source 110, and the page sequencer 215 sequences 720 the obtained structured document into segments. The feature generators 305, 310, 315, 320, and 325 generate 730 recipe features for the segments based on properties of the segment and surrounding segments. The segment classifier 330 then classifies 740 the segments as being various recipe components according to the determined weights from training the recipe model. Using the classified recipe components, the title selector 335 identifies 750 the segment containing recipe title from among segments classified as recipe titles. The recipe verifier 340 uses a measure of confidence from the recipe model to verify 760 that the candidate recipe is a recipe. If the recipe passes verification, then the recipe and its classified segments are stored 770 in the recipe store 205.

Selecting a Representative Image

Figure 8:
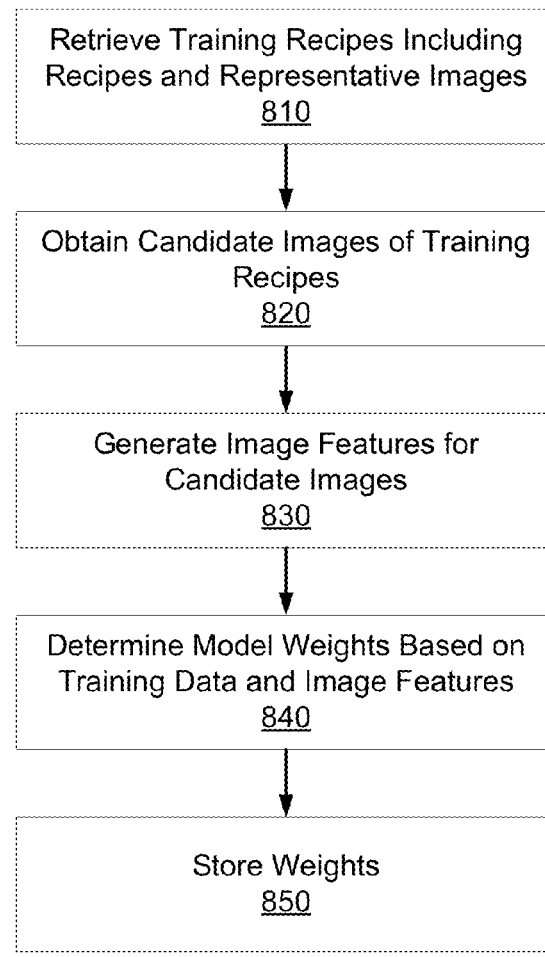
FIG. 8 is a flowchart illustrating a method of training an image model used to select a representative image, in accordance with an embodiment.

FIG. 8 is a flowchart illustrating a method of training an image model used to select a representative image, in accordance with an embodiment. The image selector 230 retrieves 810 training recipes from the recipe store 205. The training recipes include classified recipe components and representative training images of those recipes. However, the stored training recipes may not include the candidate images from the training recipe's source, so the training image selector 230 also obtains 820 candidate images from the recipe source 110 of the training recipes. For each of the plurality of candidate images, the feature generators 410, 415, 420, and 425 generate 830 image features based on properties of the candidate image, text proximate to the candidate image, and the position of the images within the training recipe. The generated image features are the input for the image model. Selection of the representative training image for a training recipe is the expected output of the image model. The representative image selector 430 then determines 840 weights for the image model to minimize discrepancy between the expected output (the representative training image) and the output representative image of the image model for the inputs (the image features). These determined weights are stored 850 for use in determining the representative image for a parsed recipe.

Figure 9:
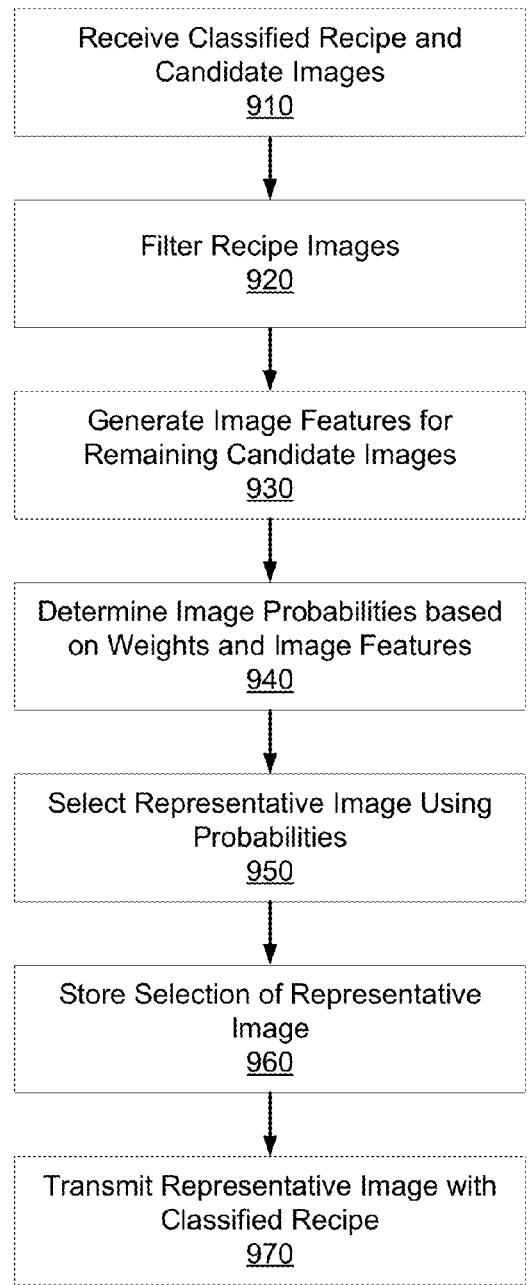
FIG. 9 is a flowchart illustrating a method of selecting a representative image using a trained image model, in accordance with an embodiment.

FIG. 9 is a flowchart illustrating a method of selecting a representative image using a trained image model, in accordance with an embodiment. The image selector 230 receives 910 a recipe including classified components of the recipe and candidate images. The image filter 405 may filter 920 candidate images that fail conditional tests (e.g., image position in body of structured document, image size greater than a threshold). The image feature generators 410, 415, 420, and 425 generate 930 image features based on properties of the candidate image, text proximate to the candidate image, and the position of the images within the training recipe. The representative image selector 430 then determines 940 probabilities of the candidate images being a representative image of the recipe using the determined weights from training the image model. The representative image selector 430 then ranks the candidate images by the determined probabilities and selects 950 a representative image from the candidate images. This representative image is stored 960 in conjunction with the recipe in the recipe store 205. In response to a request from a client device 130, the recipe server 120 transmits 970 the recipe for display on a client device 130.

Computer System

Figure 10:
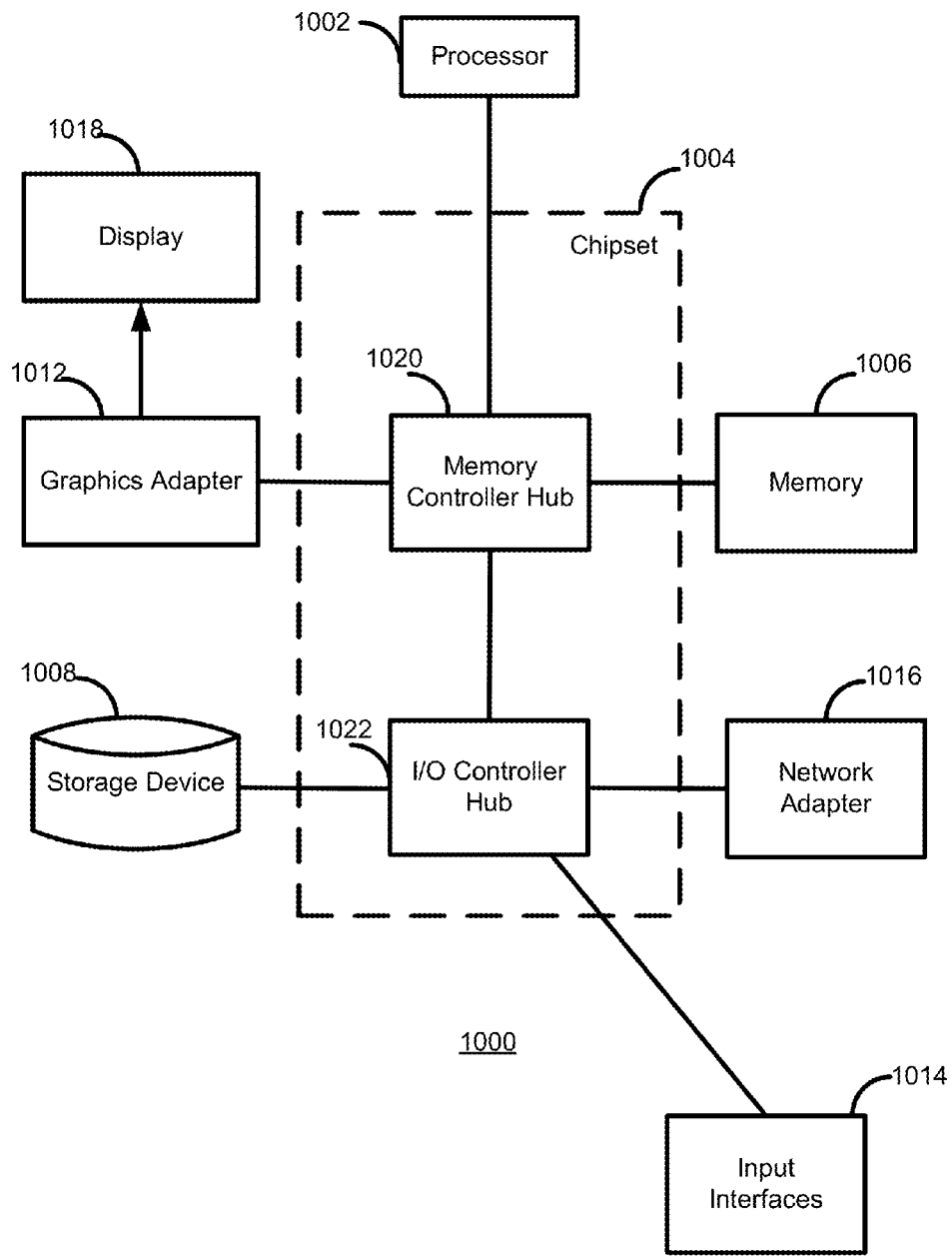
FIG. 10 is a block diagram illustrating an example computer for implementing the entities such as the recipe server shown in FIG. 2, in accordance with an embodiment.

FIG. 10 is a block diagram illustrating an example computer for implementing the entities such as the recipe server 120 shown in FIG. 1, in accordance with an embodiment. The computer 1000 includes at least one processor 1002 coupled to a chipset 1004. The chipset 1004 includes a memory controller hub 1020 and an input/output (I/O) controller hub 1022. A memory 1006 and a graphics adapter 1012 are coupled to the memory controller hub 1020, and a display 1018 is coupled to the graphics adapter 1012. A storage device 1008, input interfaces 1014, and network adapter 1016 are coupled to the I/O controller hub 1022. Other embodiments of the computer 1000 have different architectures.

The storage device 1008 is a non-transitory computer-readable storage medium such as a hard drive, compact disk read-only memory (CD-ROM), DVD, or a solid-state memory device. The memory 1006 holds instructions and data used by the processor 1002. The input interfaces 1014 may include a touch-screen interface, a mouse, track ball, or other type of pointing device, a keyboard, a scanner or other conventional digitizer, or some combination thereof, and is used to input data into the computer 1000. The graphics adapter 1012 displays images and other information on the display 1018. The network adapter 1016 couples the computer 1000 to one or more computer networks.

The computer 1000 is adapted to execute computer program modules (e.g., the source crawler 210, the recipe parser 225, the image selector 230) for recipe extraction and image selection. As used herein, the term "module" refers to computer program logic used to provide the specified functionality. Thus, a module may be implemented in hardware, firmware, and/or software. In one embodiment, program modules are stored on the storage device 1008, loaded into the memory 1006, and executed by the processor 1002.

The type of computer 1000 used by the entities of the environment 100 can vary depending upon the embodiment. For example, the recipe source 110 or recipe server 120 may include multiple computers 1000 communicating with each other through the network 140 to provide the functionality described herein. Such computers 1000 may lack some of the components described above, such as graphics adapters 1012 and displays 1018. As another example, the client device 130 is implemented on a mobile device, laptop, or tablet containing at least some of the components of the computer 1000.

Knowledge Graph

Figure 11:
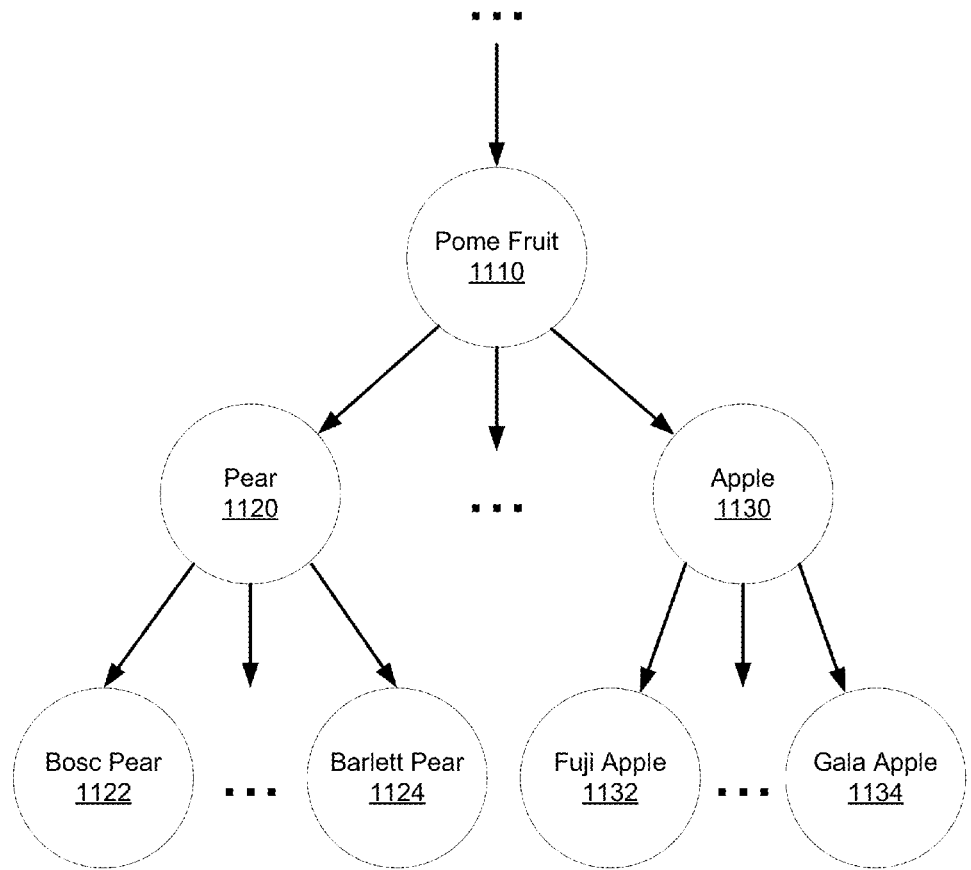
FIG. 11 is a conceptual diagram illustrating an example section of the knowledge graph, in accordance with an embodiment.

FIG. 11 is a conceptual diagram illustrating an example section of the knowledge graph stored in the knowledge graph store 235, in accordance with an embodiment. The example section of the knowledge graph includes nodes representing ingredients such as a Bosc pear 1122, a Bartlett pear 1124, a Fuji apple 1132, and a Gala apple 1134. The example section also includes abstractions including a pear 1120, an apple 1130, and a pome fruit 1110. The directed edges indicate relationships among the nodes of the illustrated section. In this case, an edge from a first node to a second node indicates that the second node represents an instance of an abstraction represented by the first node. For example, a Bosc pear 1122 and a Bartlett pear 1124 are instances of a pear 1120, and the pear 1120 and the apple 1130 are instances of the pome fruit 1110. The ellipses indicate that the illustrated section is an excerpt of an example knowledge graph from the knowledge graph store 235. For instance, the pome fruit 1110 is an instance of the abstraction "fruit," and there are additional types of pome fruits 1110, pears 1120, and apples 1130. Hence, the knowledge graph organizes food information.

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The modules described herein represent an implementation of one embodiment, but various other embodiments may include additional, fewer, or different modules to implement the methods, systems, or non-transitory, computer-readable media delineated in the accompanying claims. The described operations and their associated modules may be embodied in software, firmware, hardware, or any combinations thereof As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for selecting a representative image for a recipe from among a plurality of recipe images, the method comprising:
    receiving a recipe comprising classified recipe text describing preparation of a food product and a plurality of candidate images;
    generating image features for the plurality of candidate images, features of a candidate image representative of at least one of: classified recipe text proximate to the candidate image and position of the candidate image within the recipe;
    determining, by a processor, image probabilities of the plurality of candidate images depicting the finished food product described by the recipe, the image probabilities determined using an image model, image feature weights, and the generated image features, the image feature weights computed based on training recipes comprising classified training recipe text and training recipe images, the training recipe images including representative training images corresponding to the training recipes;
    ranking the plurality of candidate images according to the determined image probabilities;
    selecting a representative image from the candidate images according to the ranking of the candidate images, the selected representative image having a highest image probability of the determined image probabilities; and
    storing the selected representative image in association with the retrieved recipe.

2. The method of claim 1, further comprising:
transmitting the representative image and the classified recipe text for display by a client device in response to a request for the recipe.

3. The method of claim 1, wherein receiving the recipe comprising the candidate images comprises:
filtering the plurality of candidate images to remove candidate images positioned in a header, footer, or sidebar of a structured document from which the recipe was obtained.

4. The method of claim 1, the method further comprising creating the classified recipe text through a recipe classifying method comprising:
obtaining source content containing text of a candidate recipe and the candidate images, the text and the candidate images contained in a hierarchical structure;
sequencing the text into segments based on the hierarchical structure, the sequenced segments corresponding to consecutive text in a display presentation of the text;
generating recipe features based on the sequenced segments, the recipe features representative of at least one of: text in a segment and a position of the segment in the hierarchical structure of the text;
determining classifications of the sequenced segments using a recipe model, recipe feature weights, and the generated recipe features, the recipe feature weights computed based on training recipes comprising classified training recipe text, the classifications comprising recipe ingredients and recipe preparation steps; and
storing classifications of the sequenced segments as the classified recipe text.

5. The method of claim 1, wherein the generated features of the candidate image are further representative of image metadata selected from at least one of: an image title, an image alternative text, and an image filename.

6. The method of claim 1, wherein the classified recipe text comprises a recipe title of the received recipe, and the generated features of the candidate image include a feature representative of a match between the recipe title and image metadata of the candidate image.

7. The method of claim 1, wherein the generated features of the candidate image include a feature corresponding to a histogram of oriented gradients within the candidate image.

8. The method of claim 1, wherein the generated features include a source-specific feature corresponding to a particular webpage from which the recipe was obtained.

9. The method of claim 1, wherein the generated features of the candidate image include a feature indicating whether the candidate image occurs before an ingredients list in the classified recipe text of the received recipe.

10. The method of claim 1, wherein the generated features include features corresponding to an ordering of the candidate image among the candidate images.

11. A non-transitory, computer-readable storage medium comprising instructions for selecting a representative image for a recipe from among a plurality of recipe images, the instructions when executed by a processor cause the processor to:
receive a recipe comprising classified recipe text and a plurality of candidate images;
generate image features for the plurality of candidate images, features of a candidate image representative of at least one of: classified recipe text proximate to the candidate image and position of the candidate image within the recipe;
determine image probabilities of the plurality of candidate images depicting a finished food product described by the recipe after preparation is complete, the image probabilities determined using an image model, image feature weights, and the generated image features, the image feature weights computed based on training recipes comprising classified training recipe text and training recipe images, the training recipe images including representative training images corresponding to the training recipes;
rank the plurality of candidate images according to the determined image probabilities;
select a representative image from the candidate images according to the ranking of the candidate images, the selected representative image having a highest image probability of the determined image probabilities; and
store the selected representative image in association with the retrieved recipe.

12. The non-transitory, computer-readable storage medium of claim 11, the instructions further comprising instructions causing the processor to:
transmit the representative image and the classified recipe text for display by a client device in response to a request for the recipe.

13. The non-transitory, computer-readable storage medium of claim 11, wherein the instructions for receiving the recipe comprising the candidate images comprise instructions causing the processor to:
filter the plurality of candidate images to remove candidate images positioned in a header, footer, or sidebar of a structured document from which the recipe was obtained.

14. The non-transitory, computer-readable storage medium of claim 11, the instructions further comprising instructions for creating the classified recipe text through instructions causing the processor to:
obtain source content containing text of a candidate recipe and the candidate images, the text and the candidate images contained in a hierarchical structure;
sequence the text into segments based on the hierarchical structure, the sequenced segments corresponding to consecutive text in a display presentation of the text;
generate recipe features based on the sequenced segments, the recipe features representative of at least one of: text in a segment and a position of the segment in the hierarchical structure of the text;
determine classifications of the sequenced segments using a recipe model, recipe feature weights, and the generated recipe features, the recipe feature weights computed based on training recipes comprising classified training recipe text, the classifications comprising recipe ingredients and recipe preparation steps; and
store classifications of the sequenced segments as the classified recipe text.

15. The non-transitory, computer-readable storage medium of claim 11, wherein the generated features of the candidate image are further representative of image metadata selected from at least one of: an image title, an image alternative text, and an image filename.

16. The non-transitory, computer-readable storage medium of claim 11, wherein the classified recipe text comprises a recipe title of the received recipe, and the generated features of the candidate image include a feature representative of a match between the recipe title and image metadata of the candidate image.

17. The non-transitory, computer-readable storage medium of claim 11, wherein the generated features of the candidate image include a feature corresponding to a histogram of oriented gradients within the candidate image.

18. The non-transitory, computer-readable storage medium of claim 11, wherein the generated features include a source-specific feature corresponding to a particular webpage from which the recipe was obtained.

19. The non-transitory, computer-readable storage medium of claim 11, wherein the generated features of the candidate image include a feature indicating whether the candidate image occurs before an ingredients list in the classified recipe text of the received recipe.

20. A system for selecting a representative image for a recipe from among a plurality of recipe images, the system comprising:
- a processor; and
- a non-transitory, computer-readable storage medium comprising instructions executable by the processor, the instructions for:
    - receiving a recipe comprising classified recipe text and a plurality of candidate images;
    - generating image features for the plurality of candidate images, features of a candidate image representative of at least one of: classified recipe text proximate to the candidate image and position of the candidate image within the recipe;
    - determining image probabilities of the plurality of candidate images depicting a finished food product described by the recipe after preparation is complete, the image probabilities determined using an image model, image feature weights, and the generated image features, the image feature weights computed based on training recipes comprising classified training recipe text and training recipe images, the training recipe images including representative training images corresponding to the training recipes;
    - ranking the plurality of candidate images according to the determined image probabilities;
    - selecting a representative image from the candidate images according to the ranking of the candidate images, the selected representative image having a highest image probability of the determined image probabilities; and
    - storing the selected representative image in association with the retrieved recipe.

* * * * *